US009998002B2

(12) United States Patent
Englekirk

(10) Patent No.: US 9,998,002 B2
(45) Date of Patent: *Jun. 12, 2018

(54) DIFFERENTIAL CHARGE PUMP

(71) Applicant: pSemi Corporation, San Diego, CA (US)

(72) Inventor: Robert Mark Englekirk, Littleton, CO (US)

(73) Assignee: pSemi Corporation, San Diego, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/670,945

(22) Filed: Aug. 7, 2017

(65) Prior Publication Data

US 2018/0091045 A1  Mar. 29, 2018

Related U.S. Application Data

(63) Continuation of application No. 15/179,416, filed on Jun. 10, 2016, now Pat. No. 9,768,683, which is a continuation of application No. 13/932,996, filed on Jul. 1, 2013, now Pat. No. 9,413,362.

(51) Int. Cl.
*G05F 1/10* (2006.01)
*H02M 3/07* (2006.01)

(52) U.S. Cl.
CPC .................... *H02M 3/07* (2013.01)

(58) Field of Classification Search
CPC .......... H02M 3/07; H02M 3/073; H02M 3/00; H02M 1/14

USPC .......... 327/536, 537; 363/59–61; 365/189.09
See application file for complete search history.

(56) References Cited

U.S. PATENT DOCUMENTS

| | | | |
|---|---|---|---|
| 5,036,229 A * | 7/1991 | Tran ...................... | H02M 3/073 307/110 |
| 9,413,362 B2 * | 8/2016 | Englekirk ............. | H03L 7/0891 |
| 9,768,683 B2 * | 9/2017 | Englekirk ............... | H02M 3/07 |
| 9,778,669 B2 | 10/2017 | Kim et al. | |
| 9,793,795 B2 | 10/2017 | Englekirk | |
| 2016/0285363 A1 | 9/2016 | Englekirk | |
| 2018/0046210 A1 | 2/2018 | Kim et al. | |

OTHER PUBLICATIONS

Skibinski, Thomas S., Office Action received from the USPTO dated Aug. 23, 2016 for U.S. Appl. No. 15/179,416, 28 pgs.

(Continued)

*Primary Examiner* — Thomas Skibinski
(74) *Attorney, Agent, or Firm* — Jaquez Land Greenhaus LLP; Martin J. Jacquez, Esq.; John Land, Esq.

(57) ABSTRACT

A DC-to-DC voltage converter comprising a differential charge pump that utilizes a differential clocking scheme to reduce output electrical noise by partial cancellation of charge pump glitches (voltage transients), and a corresponding method of operating a differential charge pump. The differential charge pump can be characterized as having at least two charge pump sections that initiate charge pumping in opposite phases of a clock signal to transfer (pump) charge to storage capacitors. The differential charge pump is particularly well suited for implementation in integrated circuit chips requiring negative and/or positive voltages, and multiples of such voltages, based on a single input voltage.

26 Claims, 5 Drawing Sheets

(56) References Cited

OTHER PUBLICATIONS

Skibinski, Thomas S., Office Action received from the USPTO dated Mar. 2, 2017 for U.S. Appl. No. 15/179,416, 52 pgs.
Skibinski, Thomas S., Notice of Allowance received from the USPTO dated Apr. 24, 2017 for U.S. Appl. No. 15/179,416, 15 pgs.
Skibinski, Thomas S., Notice of Allowance received from the USPTO dated Jun. 22, 2017 for U.S. Appl. No. 15/179,416, 14 pgs.
Englekirk, Robert Mark, Response filed in the USPTO dated Nov. 18, 2016 for U.S. Appl. No. 15/179,416, 17 pgs.
Englekirk, Robert Mark, Response filed in the USPTO dated Mar. 30, 2017 for U.S. Appl. No. 15/179,416, 16 pgs.
Hiltunen, Thomas J., Notice of Allowance received from the USPTO dated Aug. 17, 2017 for U.S. Appl. No. 15/382,483, 20 pgs.
Burgener, et al., Response filed in the USPTO dated Aug. 31, 2017 for U.S. Appl. No. 14/883,525, 9 pgs.
Wells, Kenneth B., Final Office Action received from the USPTO dated Oct. 10, 2017 for U.S. Appl. No. 14/883,525, 22 pgs.
Mehari, Yemane, Office Action received from the USPTO dated Feb. 20, 2018 for U.S. Appl. No. 15/688,597, 12 pgs.
Wells, Kenneth B., Office Action received from the USPTO dated Feb. 22, 2018 for U.S. Appl. No. 14/883,525, 19 pgs.
Nguyen, Hieu P., Office Action received from the USPTO dated Mar. 16, 2018 for U.S. Appl. No. 15/602,042, 26 pgs.

\* cited by examiner ive, an antenna 102 must be coupled to receive circuitry 103 that may further include, for example, a filter 104 and a low noise amplifier 106, to provide the received signal for further processing. However, while such systems are transmitting, the antenna 102 must be disconnected from the sensitive receive circuitry 103 and coupled instead to relatively high power transmit circuitry 107. The transmit circuitry 107 may further include, for example, a power amplifier 108 and a transmit filter 110 to process a transmit signal. Note that the circuit shown in FIG. 1 is schematically simple for ease of understanding; in an actual implementation, there are often multiple transmit and receive circuits, and transmission and reception may be occurring on the same path at the same time.

DIFFERENTIAL CHARGE PUMP

CROSS-REFERENCE TO RELATED APPLICATIONS—CLAIM OF PRIORITY

The present application is a continuation of commonly owned co-pending U.S. patent application Ser. No. 15/179,416, entitled "Differential Charge Pump", filed on Jun. 10, 2016; and application Ser. No. 15/179,416 is a continuation of commonly owned U.S. patent application Ser. No. 13/932,996, entitled "Differential Charge Pump", filed on Jul. 1, 2013, (now U.S. Pat. No. 9,413,362, issued Aug. 9, 2016), which Ser. Nos. 15/179,416 and 13/932,996 are incorporated by reference herein in their entirety. Application Ser. No. 13/932,996 is related to the following commonly assigned issued patents: U.S. Pat. No. 7,719,343 issued May 18, 2010 entitled "Low Noise Charge Pump Method and Apparatus"; identically entitled U.S. Pat. No. 8,378,736 issued Feb. 19, 2013; U.S. Pat. No. 8,994,452 issued Mar. 31, 2015, entitled "Low-Noise High Efficiency Bias Generation Circuits and Method"; U.S. Pat. No. 8,373,490 issued Feb. 12, 2013 entitled "Method, System and Apparatus for RF and DC Switching"; U.S. Pat. No. 8,686,787 issued Apr. 1, 2014, entitled "High Voltage Ring Pump with Inverter Stages and Voltage Boosting Stages"; and U.S. Pat. No. 8,816,659 issued Aug. 26, 2014, entitled "Low-Noise High Efficiency Bias Generation Circuits and Method".

BACKGROUND (1) Technical Field

This invention generally relates to electronic power supplies, and more specifically to capacitive energy transfer DC-to-DC converters (DC/DC converters), such as charge pumps.

(2) Background

DC/DC converter power supply circuits provide a DC output voltage based upon a DC source voltage, where the output voltage is typically different than the input voltage. As the term is used herein, DC/DC converters do not encompass voltage reduction regulator circuits that use a linear pass device, but rather involve energy transfer from input to output through an energy storage device, such as a capacitor or an inductor.

A type of DC/DC converter is a "charge pump", which obtains energy for the output voltage primarily by means of capacitive transfer from the source to the output. Energy transfer capacitors used in charge pumps are typically known as "fly capacitors" or "fly caps". An inductor is not generally the primary energy transfer device in a charge pump, though of course hybrid devices are possible that employ inductive energy transfer in addition to capacitive energy transfer. A charge pump may derive an output voltage that is higher than a source voltage, or that is inverted from a source voltage, or that is referenced to a different voltage than the source voltage, and may do all of these things concurrently.

Charge pumps may be implemented for a wide variety of purposes. They are well suited for integrated circuit fabrication because the devices and elements required are compatible with most integrated circuit fabrication techniques. For example, a charge pump may be employed to generate a negative gate bias supply for an integrated circuit that switches an antenna between send and receive circuitry of a transceiver, as shown in FIG. 1. Many wireless transceivers, such as cellular telephones, employ a single antenna for both receiving and transmitting. While such systems are receiving, an antenna 102 must be coupled to receive circuitry 103 that may further include, for example, a filter 104 and a low noise amplifier 106, to provide the received signal for further processing. However, while such systems are transmitting, the antenna 102 must be disconnected from the sensitive receive circuitry 103 and coupled instead to relatively high power transmit circuitry 107. The transmit circuitry 107 may further include, for example, a power amplifier 108 and a transmit filter 110 to process a transmit signal. Note that the circuit shown in FIG. 1 is schematically simple for ease of understanding; in an actual implementation, there are often multiple transmit and receive circuits, and transmission and reception may be occurring on the same path at the same time.

A radio frequency (RF) switch 112 may be used to perform such antenna switching functions, as well as RF switching functions in general. Ideally, such switches may be integrated together with the receive and/or transmit circuitry, and in any event are desirably very small, due to integrated circuit die cost and space limitations in portable transceivers such as mobile telephones and handy talkies. In order to achieve good performance from switching devices, such as FETs, used to implement such RF switches, many designs need a special bias supply that extends negatively below the supply rails of the transmit and receive circuitry, such as a −3V supply. In view of the space and cost constraints of transceiver units such as mobile telephones, a charge pump is particularly suitable for generating such a bias supply because it can be readily integrated into a very small circuit and requires only a single external voltage supply, eliminating the need for multiple power supplies.

Fully-integrated charge pump based power supplies can be both electrically noisy and weak (i.e., not able to drive large load currents). The output drive strength is related to the frequency of the clock source driving the charge pump, and the size of the capacitors used to shuttle charge to a new voltage level. A higher clock frequency will improve the output drive strength but can allow for more noise coupling into the RF path. In particular, the frequency of the charge pump clock can show up as a distinct spur both at multiples of itself in baseband frequencies and/or at multiples of itself offset from whatever RF frequency is being utilized by a particular system. In the case of a switch with both transmit and receive signals present in different bands, it is possible for clock spurs offset from the transmit band to show up in the receive band. Thus it is desirable to use lower clock frequencies for charge pump circuits.

Using larger capacitors also improves drive strength of the charge pump, but doing so can consume a significant amount of integrated circuit chip area, and the more chip area that is used, the more coupling area there is to the RF path. Thus, there are trade-offs to be made to get to an optimal design for charge pump circuits used in a particular system.

In a simple single-stage charge pump, one capacitor is used as a "fly" capacitor, and one capacitor is used for a storage capacitor. The fly capacitor will alternately charge to some supply voltage +Vdd and then be switched to some other location to discharge into the "pumped" voltage supply, which is the new voltage supply being generated. In a simple negative charge pump example, the fly capacitor would be charged to Vdd relative to ground on one phase of a clock signal, and then on the other phase of the clock signal, the positive terminal would be tied to ground and the negative terminal to a storage capacitor to provide an output node Vss; this would charge Vss to be at −Vdd (thus the example circuit is a negative voltage "pumped" power supply; positive voltage charge pumps are equally well known in the art).

FIG. 2a is a schematic circuit diagram showing a prior art single-stage charge pump. FIG. 2b is a timing diagram of a two-phase clock signal 200 used in conjunction with the circuit shown in FIG. 2a. During phase 1 of the clock signal 200, switches 202 and 204 are closed and switches 208 and 210 are open, thereby coupling the positive terminal of the fly capacitor Cfly 206 to a supply voltage Vdd and the negative terminal to ground, thus charging Cfly to Vdd. During phase 2 of the clock signal 200, switches 202 and 204 are open and switches 208 and 210 are closed, thereby coupling the positive terminal of the fly capacitor Cfly 206 to ground and the negative terminal to a storage capacitor Cstorage1 212, thus charging Cstorage1 toward −Vdd. An output node Vss 214 provides the desired negative voltage "pumped" power supply, at approximately −Vdd.

The size of the storage capacitor used in charge pumps is generally determined by how much clock noise can be tolerated on the resulting pumped supply to a particular system. Typically, the storage capacitor has to be much larger than the fly capacitor. As such, to get an electrically quiet output, large amounts of capacitor area are required on an integrated circuit.

For two stage charge pumps, the problem gets compounded. A two-stage charge pump would for instance be used to create a supply of −2Vdd or +3Vdd. Two fly caps and two storage capacitors are required. The drive efficiency of the charge is reduced in half while the area required by all the capacitors is doubled, assuming each individual capacitor stays the same value. It could further be shown that higher stage count charge pumps are even worse off.

FIG. 3a is a schematic circuit diagram showing a prior art two-stage charge pump. FIG. 3b is a timing diagram of a two-phase clock signal 300 used in conjunction with the circuit shown in FIG. 3a. During phase 1 of the clock signal 300, switches 302, 304, and 306 are closed and switches 308, 310, and 312 are open, thereby coupling the positive terminal of fly capacitor Cfly1 314 to a supply voltage Vdd and its negative terminal to ground, thus charging Cfly1 314 to Vdd. During the same clock phase, the positive terminal of fly capacitor Cfly2 316 is coupled to ground and its negative terminal is coupled to a storage capacitor Cstorage1 318, thus charging the negative terminal of Cfly2 316 toward −Vdd (Cstorage1 318 having been charged toward −Vdd by Cfly1 314 on previous cycles).

During phase 2 of the clock signal 300, switches 302, 304, and 306 are open and switches 308, 310, and 312 are closed, thereby coupling the positive terminal of Cfly1 to ground and its negative terminal to Cstorage1 318, thus charging Cstorage1 318 toward −Vdd. During the same clock phase, the positive terminal of Cfly2 is coupled to storage capacitor Cstorage1 and the negative terminal of Cfly2 is coupled to a storage capacitor Cstorage2 320, thus charging Cstorage2 toward −2Vdd. An output node Vss 322 provides the desired negative voltage "pumped" power supply, at approximately −2Vdd.

The switches shown in FIG. 2a and FIG. 3a may be, for example, field effect transistors (FETs) selected from the many variants available, such as IGFETs, MOSFETs, and the like. The various capacitors shown in these figures may be implemented in known manner.

The method and apparatus presented below address this need for a low-noise charge pump. Various aspects of the method and apparatus described below will be seen to provide further advantages, as well, for the design and construction of charge pumps that are relatively free of noise spurs.

SUMMARY OF THE INVENTION

The invention encompasses a DC-to-DC voltage converter comprising a differential charge pump that utilizes a differential clocking scheme to reduce output electrical noise by partial cancellation of charge pump glitches (voltage transients), and a corresponding method of operating a differential charge pump.

The inventive differential charge pump circuit can be characterized as having at least two pump sections that initiate charge pumping in opposite phases of a two-phase clock signal to transfer (pump) charge to storage capacitors. A first pump section initially charges during phase 1 of the clock signal while a second pump section initially charges during phase 2 of the clock signal. In normal embodiments, the phases of the clock are preferably configured so that adjacent switches are not "ON" (conducting) at the same time; there are multiple ways known in the art to achieve such a configuration.

The result of using the differential charge pump design of the present invention is that the charging and discharging of the storage capacitors is in essence less electrically noisy, since there is a partial cancellation of charge pump glitches during the clock phases due to adding essentially an additional phase-offset charge pump.

The inventive concept can be extended to more stages and to both positive and negative charge pumps. In particular, additional stages of a similar differential design may be added to generate other voltage multiples, such as plus or minus 3 times or 4 times the supply voltage. Additional stages of a similar differential design also may be added in parallel if desired.

The switches used within the differential charge pump may be, for example, field effect transistors (FETs) selected from the many variants available, such as IGFETs, MOSFETs, and the like. The various storage and fly capacitors used within the differential charge pump may be implemented in known manner. The capacitance values of the various storage and fly capacitors is a matter of design choice for a target system, and are generally selected to fit a desired charging time or drive strength. The inventive differential charge pump is particularly well suited for implementation in integrated circuit chips requiring negative and/or positive voltages, and multiples of such voltages, based on a single input voltage.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 2b is a timing diagram of a two-phase clock signal used in conjunction with the circuit shown in FIG. 2a.

FIG. 3a is a schematic circuit diagram showing a typical prior art two-stage charge pump.

FIG. 3b is a timing diagram of a two-phase clock signal used in conjunction with the circuit shown in FIG. 3a.

FIG. 4a is an example schematic circuit diagram showing a differential two-stage charge pump in accordance with the present invention.

FIG. 4b is a timing diagram of a two-phase clock signal used in conjunction with the circuit shown in FIG. 4a.

Like reference numbers and designations in the various drawings indicate like elements.

DETAILED DESCRIPTION OF THE INVENTION

The invention encompasses a DC-to-DC voltage converter including a differential charge pump that utilizes a differential clocking scheme to reduce output electrical noise by partial cancellation of charge pump glitches (voltage transients), and a corresponding method of operating a differential charge pump.

Figures 4A, 4B:
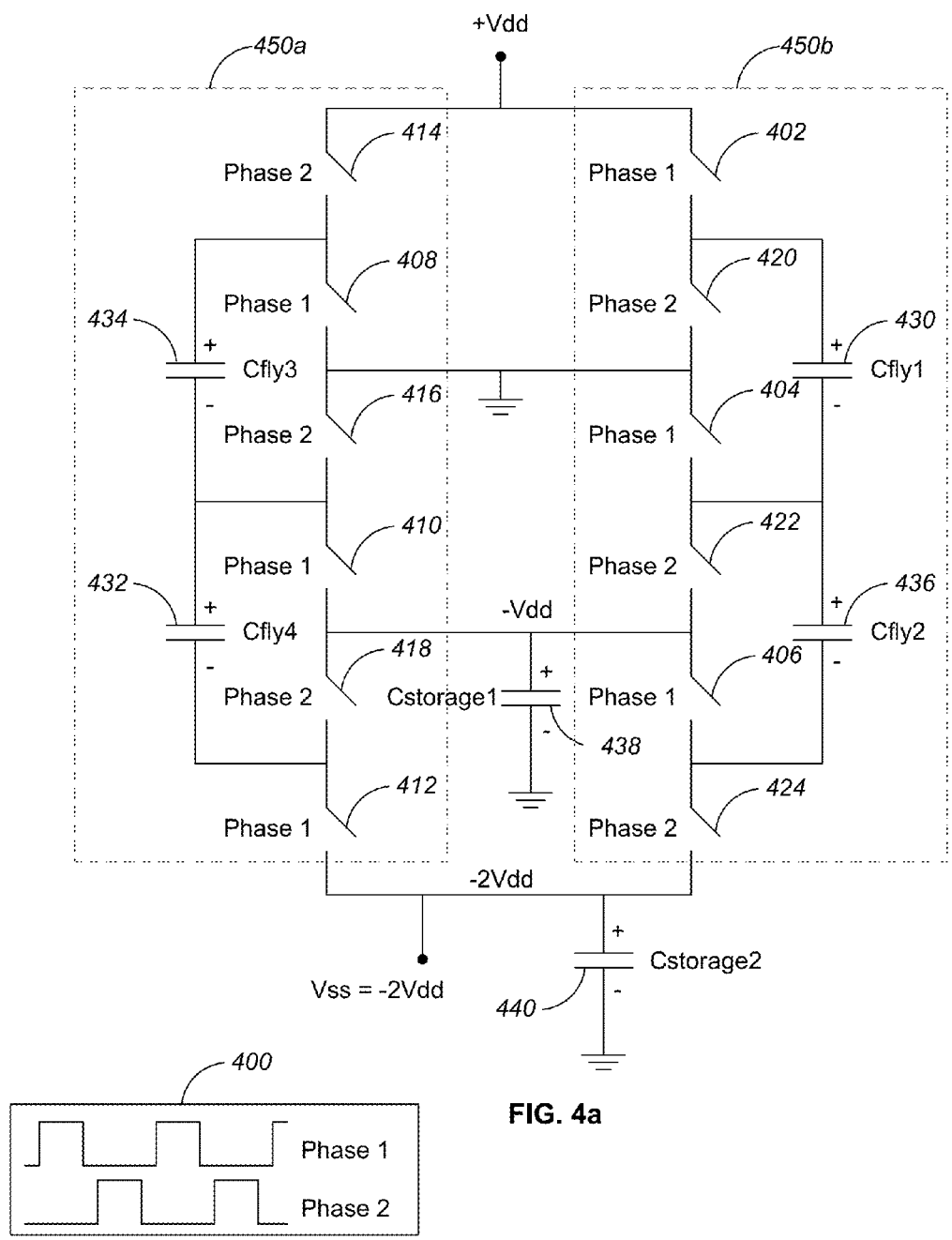

FIG. 4a is an example schematic circuit diagram showing a differential two-stage charge pump in accordance with the present invention. FIG. 4b is a timing diagram of a two-phase clock signal 400 used in conjunction with the circuit shown in FIG. 4a. In normal embodiments, the phases of the clock signal 400 are distinct and preferably configured so that adjacent switches are not "ON" (conducting) at the same time; there are multiple ways known in the art to achieve such a configuration.

During phase 1 of the clock signal 400, switches 402-412 are closed and switches 414-424 are open. Accordingly, the connections of the fly capacitors Cfly1-Clfy4 are as follows:

| Capacitor | Positive Terminal Connection | Negative Terminal Connection |
|---|---|---|
| Cfly1 | +Vdd | Ground |
| Cfly2 | Ground | Cstorage1 |
| Cfly3 | Ground | Cstorage1 |
| Cfly4 | Cstorage1 | Cstorage2/Vss |

During phase 2 of the clock signal 400, switches 402-412 are open and switches 414-424 are closed. Accordingly, the connections of the fly capacitors Cfly1-Clfy4 are as follows:

| Capacitor | Positive Terminal Connection | Negative Terminal Connection |
|---|---|---|
| Cfly1 | Ground | Cstorage1 |
| Cfly2 | Cstorage1 | Cstorage2/Vss |
| Cfly3 | +Vdd | Ground |
| Cfly4 | Ground | Cstorage1 |

In operation, during phase 1 of the clock signal 400, the fly capacitors Cfly1-Cfly4 reach the following states:

| Capacitor | State |
|---|---|
| Cfly1 | Charges to +Vdd |
| Cfly2 | Charges toward Vdd (Gnd − Vdd) by discharging Cstorage1 |
| Cfly3 | Transfers −Vdd charge to Cstorage1 and Cfly2 and Cfly4 |
| Cfly4 | Transfers −2Vdd charge to Cstorage2 by also discharging Cstorage1 |

In operation, during phase 2 of the clock signal 400, the fly capacitors Cfly1-Cfly4 reach the following states:

| Capacitor | State |
|---|---|
| Cfly3 | Charges to +Vdd |
| Cfly4 | Charges toward −Vdd (Gnd − Vdd) by discharging Cstorage1 |
| Cfly1 | Transfers −Vdd charge to Cstorage1 and Cfly2 and Cfly4 |
| Cfly2 | Transfers −2Vdd charge to Cstorage2 by also discharging Cstorage1 |

As can be seen from FIG. 4a, the inventive circuit can be characterized as having at least two pump sections 450a, 450b that initiate charge pumping in opposite phases of the clock signal 400 to transfer (pump) charge to storage capacitors (Cstorage1 438 and Cstorage2 440 in the illustrated embodiment). Thus, in the embodiment shown in FIG. 4a, Cfly3 434 in pump section 450a charges during phase 2 while its counterpart Cfly1 430 in pump section 450b charges during phase 1, and Cfly4 432 in pump section 450a transfers charge during phase 1 while its counterpart Cfly2 436 in pump section 450b transfers charge during phase 2.

The example circuit shown in FIG. 4a is a negative voltage "pumped" power supply. The inventive design applies equally well to positive voltage charge pumps. As is known in the art, achieving a particular negative voltage multiple of a positive source voltage value requires one stage to invert the initial positive voltage (i.e., a −1x charge pump), and one additional stage for each desired voltage multiple thereafter (e.g., a −2x charge pump requires two pump stages, while a −3x charge pump requires three pump stages). On the other hand, achieving a particular positive voltage multiple of a positive source voltage value requires only one stage for each desired voltage multiple because each stage is added on top of the positive source voltage (e.g., a +2x charge pump requires one pump stage, while a +3x charge pump requires two pump stages).

Figures 5A, 5B:
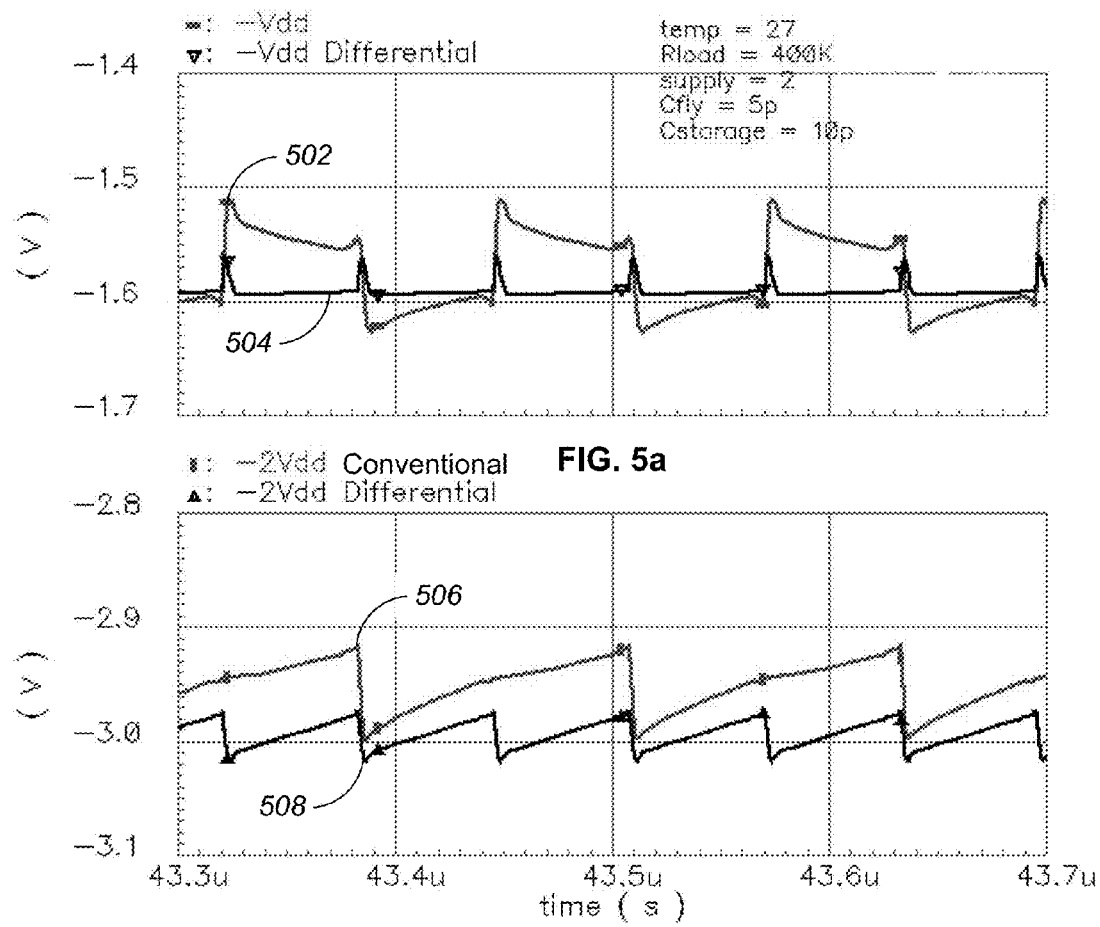
FIG. 5a is a diagram of simulated transient response waveforms versus time after one stage of charge pumping (to −Vdd) for a conventional two-stage charge pump and a two-stage differential charge pump in accordance with the present invention.
FIG. 5b is a diagram of simulated transient response waveforms versus time after two stages of charge pumping (to −2Vdd) for a conventional two-stage charge pump and a two-stage differential charge pump in accordance with the present invention.

FIG. 5a and FIG. 5b compare the relative performance of a conventional two-stage charge pump to a two-stage differential charge pump in accordance with the present invention. For this example, the two circuits being compared utilize a 2V supply and a 400K load resistor on the final output Vss. The conventional design has two 5 pF fly caps, whereas the differential approach in accordance with the present invention utilizes four 2.5 pF fly caps, thus utilizing similar capacitor area. More particularly, FIG. 5a is a diagram of simulated transient response waveforms versus time after the first stage of charge pumping (ideally to −Vdd, assuming no load resistor) for a conventional two-stage charge pump and a two-stage differential charge pump in accordance with the present invention; FIG. 5b is a diagram of simulated transient response waveforms versus time after the second stage of charge pumping (ideally to Vss=−2Vdd, assuming no load resistor) for a conventional two-stage charge pump and a two-stage differential charge pump in accordance with the present invention.

Referring to FIG. 5a, the waveform 502 (measured at the −Vdd node in FIG. 3a) from a conventional two-stage charge pump shows much larger transient voltage excursions and is further from the target value of −Vdd (−2V in this example) than the waveform 504 (measured at the −Vdd node in FIG. 4a) from a two-stage differential charge pump in accordance with the present invention.

Similarly, referring to FIG. 5b, the waveform 506 (measured at the Vss=−2Vdd node in FIG. 3a) from a conventional two-stage charge pump shows much larger transient voltage excursions and is also further from the target value of −2Vdd (−4V in this example) than does the waveform 508 (measured at the Vss=−2Vdd node in FIG. 4a) from a two-stage differential charge pump in accordance with the present invention.

For a differential charge pump circuit in accordance with FIG. 4a using the parameters noted in FIG. 5a, there is a small increase in drive strength, as seen in FIG. 5b. That is, the "−2Vdd Differential" waveform 508 is always lower than the "−2Vdd Conventional" waveform 506. This is because the "−Vdd Differential" stage (shown in FIG. 5a) is more efficient, and does not require as much capacitance.

Figure 1:
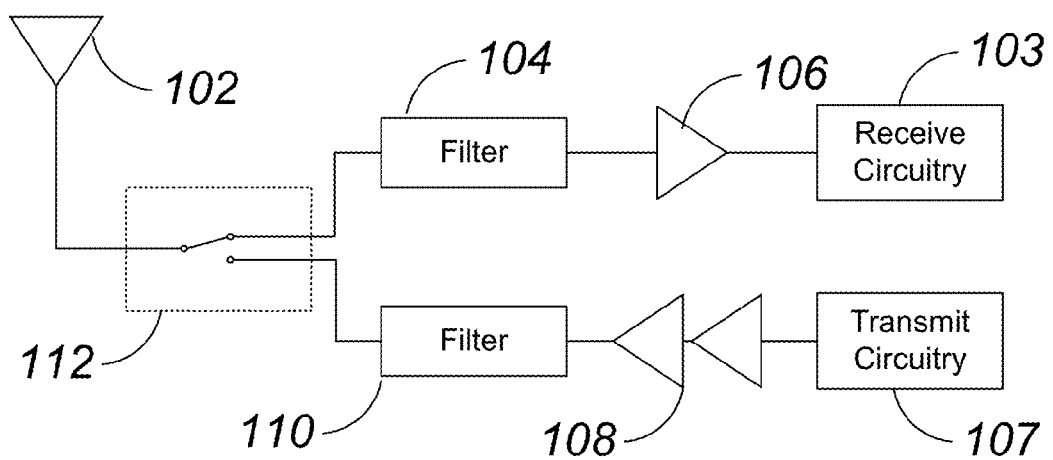
FIG. 1 is a circuit diagram of a prior art integrated circuit that switches an antenna between send and receive circuitry of a transceiver.
Figure 2A:
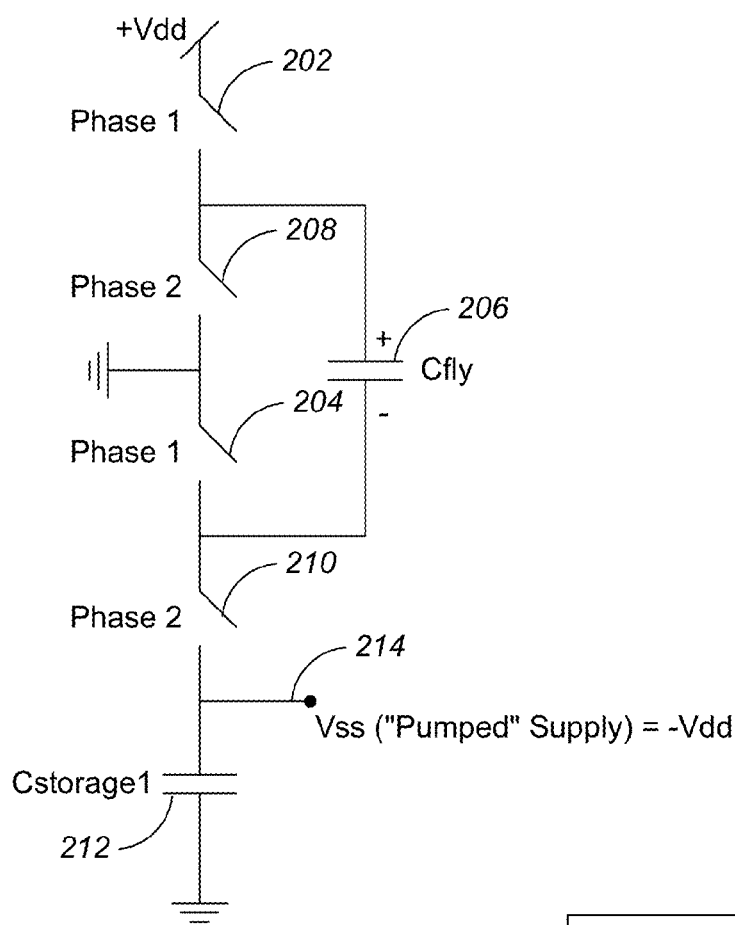
FIG. 2a is a schematic circuit diagram showing a typical prior art single-stage charge pump.
Figure 2B:
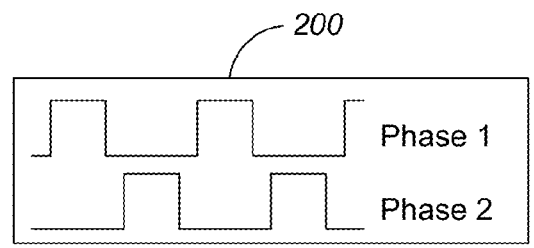
Figures 3A, 3B:
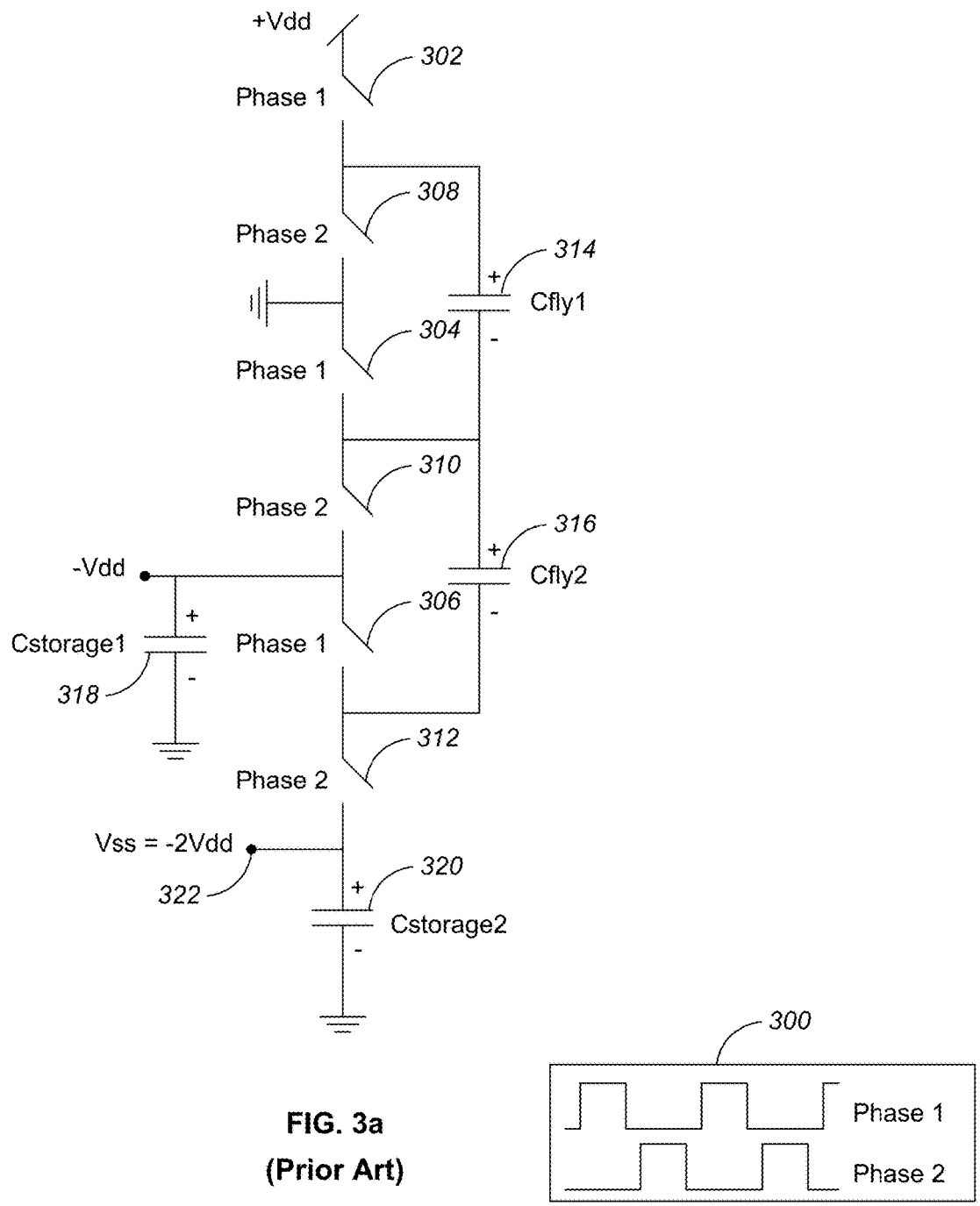

In the example of the invention used for simulating the waveforms of FIG. 5a and FIG. 5b, the four fly capacitors for the example differential charge pump circuit are half the area of the two fly capacitors used in the example two-stage prior art circuit of the type shown in FIG. 3a. Thus, the total capacitor areas are comparable between the two circuits, but the size of the storage capacitors is greatly reduced because of the differential nature of the inventive circuit. In particular, Cstorage1 438 in FIG. 4a can be very small relative to Cstorage1 318 in FIG. 3a because of the balanced nature of the differential charge pump circuit.

The result of using the differential charge pump design of the present invention is that the charging and discharging of the storage capacitors is in essence less electrically noisy, since there is a partial cancellation of charge pump glitches (voltage excursions) during the clock phases due to adding essentially an additional phase-offset two-stage charge pump.

Although a two-stage differential charge pump circuit is shown in FIG. 4a, the invention generalizes to a single stage implementation. Further, the inventive concept can be extended to more than two stages and to both positive and negative charge pumps. In particular, additional stages of a similar differential design may be added to generate other voltage multiples, such as plus or minus 3 times or 4 times the supply voltage. In practical applications, two stage and three stage differential charge pump circuits having the same or opposite polarities with respect to the input supply voltage are particularly useful. Additional stages of a similar differential design also may be added in parallel if desired, in which case it may be useful to utilize a clock signal having more than two phases.

The switches shown in FIG. 4a may be, for example, field effect transistors (FETs) selected from the many variants available, such as IGFETs, MOSFETs, and the like. However, in some circumstances it is possible to substitute a simple diode (or diode connected FET) for a switch, when the voltage and current flow requirements of the particular configuration of a specific charge pump circuit permit.

The various capacitors shown in the figures may be implemented in known manner. The capacitance values of the various storage and fly capacitors is a matter of design choice for a target system, and are generally selected to fit a desired charging time or drive strength. The inventive differential charge pump is particularly well suited for implementation in integrated circuit chips requiring negative and/or positive voltages, and multiples of such voltages, based on a single input voltage.

Another aspect of the invention includes a method for operating a charge pump in a differential configuration, including the steps of:

STEP 1: providing at least two charge pump sections electrically coupled in parallel to an input voltage source, wherein each charge pump section generates an output voltage comprising a charge-pumped multiple of an input voltage from the input voltage source;

STEP 2: providing a clock signal having at least two phases, each phase being electrically coupled to each of the at least two charge pump sections, for generating charge pumping cycles in each charge pump section;

STEP 3: initiating a charge pumping cycle in at least a first one of the charge pump sections on a first phase of the clock signal; and STEP 4: initiating a charge pumping cycle in at least a second one of the charge pump sections on a second phase of the clock signal, wherein the second phase of the clock signal is different from the first phase of the clock signal.

A skilled person will understand certain features without a need for explicit details. For example, maintaining a reasonably constant voltage on the final output generally requires a filter capacitor or the like, which is not shown in the figures. As another example, current and voltage for the output may vary depending upon many factors. The skilled person may make allowance for such factors to anticipate a voltage of the output, or may choose to regulate the voltage of the output. Such regulation is not shown, but may, for example, comprise controlling the frequency of "pump" cycles. Regulation may also comprise controlling a value of the voltage source for the charge pump.

A number of embodiments of the invention have been described. It is to be understood that various modifications may be made without departing from the spirit and scope of the invention. For example, some of the steps described above may be order independent, and thus can be performed in an order different from that described. It is to be understood that the foregoing description is intended to illustrate and not to limit the scope of the invention, which is defined by the scope of the following claims, and that other embodiments are within the scope of the claims.

What is claimed is:

1. A differential charge pump, including:
   (a) a clock signal having a first phase and a second phase, the second phase being different from the first phase, for controlling switch devices regulating charge pumping cycles of the differential charge pump;
   (b) at least two charge pump sections electrically coupled in parallel to an input voltage source separate from the clock signal, wherein each charge pump section generates an output voltage different from an input voltage from the input voltage source, each charge pump section including at least two charge pumping stages having an input and an output, the input of each charge pumping stage being switchably coupled to an associated input voltage source separate from the clock signal and the output of each charge pumping stage being switchably coupled to one of (i) an associated intermediate storage capacitance coupled to and shared with at least one other of the at least two charge pump sections or (ii) a common terminal storage capacitance, each charge pumping stage including:
      (1) a fly capacitor having an input and an output;
      (2) a first switch device coupled between the input of the fly capacitor and an intermediate node, and coupled to and controlled by a selected one of the first phase or the second phase of the clock signal; and (3) a second switch device coupled between the intermediate node and the output of the fly capacitor, and coupled to and controlled by a selected one of the second phase or the first phase of the clock signal, the selected phase controlling the second switch device being different from the selected phase controlling the first switch device;

wherein the charge pumping cycle in at least a first one of the charge pump sections is initiated on the first phase of the clock signal, and the charge pumping cycle in at least a second one of the charge pump sections is initiated on the second phase of the clock signal.

2. The invention of claim 1, wherein the output of at least one charge pumping stage is switchably coupled to the associated intermediate storage capacitance coupled to and shared with at least one other of the at least two charge pump sections, and the output of at least one other charge pumping stage is switchably coupled to the common terminal storage capacitance.

3. The invention of claim 1, wherein the output voltage of the charge pump is the opposite polarity with respect to the input voltage source.

4. The invention of claim 1, wherein the output voltage of the charge pump is the same polarity with respect to the input voltage source.

5. The invention of claim 1, wherein each charge pump section includes two charge pumping stages.

6. The invention of claim 1, wherein each charge pump section includes at least three charge pumping stages.

7. The invention of claim 1, wherein the first switch device and the second switch device of each charge pumping stage are field effect transistors.

8. The invention of claim 7, wherein the first switch device and the second switch device of each charge pumping stage are MOSFETS.

9. The invention of claim 1, wherein the differential charge pump is fabricated as at least part of an integrated circuit.

10. The invention of claim 9, wherein the integrated circuit further includes additional circuitry other than the differential charge pump.

11. The invention of claim 10, wherein the additional circuitry includes at least one radio frequency switch.

12. The invention of claim 1, wherein the first phase and the second phase of the clock signal are non-overlapping.

13. A differential charge pump, including:
(a) a clock signal having a first phase and a second phase, the second phase being different from the first phase, for controlling field effect transistor (FET) switch devices regulating charge pumping cycles of the differential charge pump;
(b) at least two charge pump sections electrically coupled in parallel to an input voltage source separate from the clock signal, wherein each charge pump section generates an output voltage different from an input voltage from the input voltage source, each charge pump section including at least two charge pumping stages having an input and an output, the input of each charge pumping stage being switchably coupled to an associated input voltage source separate from the clock signal and the output of each charge pumping stage being switchably coupled to one of (i) an associated intermediate storage capacitance coupled to and shared with at least one other of the at least two charge pump sections or (ii) a common terminal storage capacitance, each charge pumping stage including:
(1) a fly capacitor having an input and an output;
(2) a first FET switch device coupled between the input of the fly capacitor and an intermediate node, and coupled to and controlled by a selected one of the first phase or the second phase of the clock signal; and
(3) a second FET switch device coupled between the intermediate node and the output of the fly capacitor, and coupled to and controlled by a selected one of the second phase or the first phase of the clock signal, the selected phase controlling the second FET switch device being different from the selected phase controlling the first FET switch device;

wherein the charge pumping cycle in at least a first one of the charge pump sections is initiated on the first phase of the clock signal, and the charge pumping cycle in at least a second one of the charge pump sections is initiated on the second phase of the clock signal; and
wherein the differential charge pump is fabricated as at least part of a MOSFET integrated circuit that includes at least one radio frequency switch.

14. A method for operating a charge pump, including:
(a) providing a clock signal having a first phase and a second phase, the second phase being different from the first phase, for controlling switch devices regulating charge pumping cycles of the charge pump;
(b) providing at least two charge pump sections electrically coupled in parallel to an input voltage source separate from the clock signal, wherein each charge pump section generates an output voltage different from an input voltage from the input voltage source, each charge pump section including at least two charge pumping stages having an input and an output, the input of each charge pumping stage being switchably coupled to an associated input voltage source separate from the clock signal and the output of each charge pumping stage being switchably coupled to one of an associated intermediate storage capacitance coupled to and shared with at least one other of the at least two charge pump sections or a common terminal storage capacitance, each charge pumping stage including:
(1) a fly capacitor having an input and an output;
(2) a first switch device coupled between the input of the fly capacitor and an intermediate node, and coupled to and controlled by a selected one of the first phase or the second phase of the clock signal; and
(3) a second switch device coupled between the intermediate node and the output of the fly capacitor, and coupled to and controlled by a selected one of the second phase or the first phase of the clock signal, the selected phase controlling the second switch device being different from the selected phase controlling the first switch device;
(c) initiating a charge pumping cycle in at least a first one of the charge pump sections on the first phase of the clock signal; and
(d) initiating a charge pumping cycle in at least a second one of the charge pump sections on the second phase of the clock signal.

15. The method of claim 14, further including switchably coupling the output of at least one charge pumping stage to the associated intermediate storage capacitance coupled to and shared with at least one other of the at least two charge pump sections, and switchably coupling the output of at least one other charge pumping stage to the common terminal storage capacitance.

16. The method of claim 14, wherein the output voltage of the charge pump is the opposite polarity with respect to the input voltage source.

17. The method of claim 14, wherein the output voltage of the charge pump is the same polarity with respect to the input voltage source.

18. The method of claim 14, wherein each charge pump section includes two charge pumping stages.

19. The method of claim 14, wherein each charge pump section includes at least three charge pumping stages.

20. The method of claim 14, wherein the first switch device and the second switch device of each charge pumping stage are field effect transistors.

21. The method of claim 20, wherein the first switch device and the second switch device of each charge pumping stage are MOSFETS.

22. The method of claim 14, further including fabricating the differential charge pump as at least part of an integrated circuit.

23. The method of claim 22, wherein the integrated circuit further includes additional circuitry other than the differential charge pump.

24. The method of claim 23, wherein the additional circuitry includes at least one radio frequency switch.

25. The method of claim 14, wherein the first phase and the second phase of the clock signal are non-overlapping.

26. A method for operating differential charge pump, including:
(a) providing a clock signal having a first phase and a second phase, the second phase being different from the first phase, for controlling field effect transistor (FET) switch devices regulating charge pumping cycles of the differential charge pump;
(b) providing at least two charge pump sections electrically coupled in parallel to an input voltage source separate from the clock signal, wherein each charge pump section generates an output voltage different from an input voltage from the input voltage source, each charge pump section including at least two charge pumping stages having an input and an output, the input of each charge pumping stage being switchably coupled to an associated input voltage source separate from the clock signal and the output of each charge pumping stage being switchably coupled to one of (i) an associated intermediate storage capacitance coupled to and shared with at least one other of the at least two charge pump sections or (ii) a common terminal storage capacitance, each charge pumping stage including:
  (1) a fly capacitor having an input and an output;
  (2) a first FET switch device coupled between the input of the fly capacitor and an intermediate node, and coupled to and controlled by a selected one of the first phase or the second phase of the clock signal; and
  (3) a second FET switch device coupled between the intermediate node and the output of the fly capacitor, and coupled to and controlled by a selected one of the second phase or the first phase of the clock signal, the selected phase controlling the second FET switch device being different from the selected phase controlling the first FET switch device;
(c) configuring the clock signal to initiate a charge pumping cycle in at least a first one of the charge pump sections on the first phase of the clock signal, and to initiate a charge pumping cycle in at least a second one of the charge pump sections on the second phase of the clock signal; and
fabricating the differential charge pump as at least part of a MOSFET integrated circuit that includes at least one radio frequency switch.

* * * * *